UNITED STATES PATENT OFFICE.

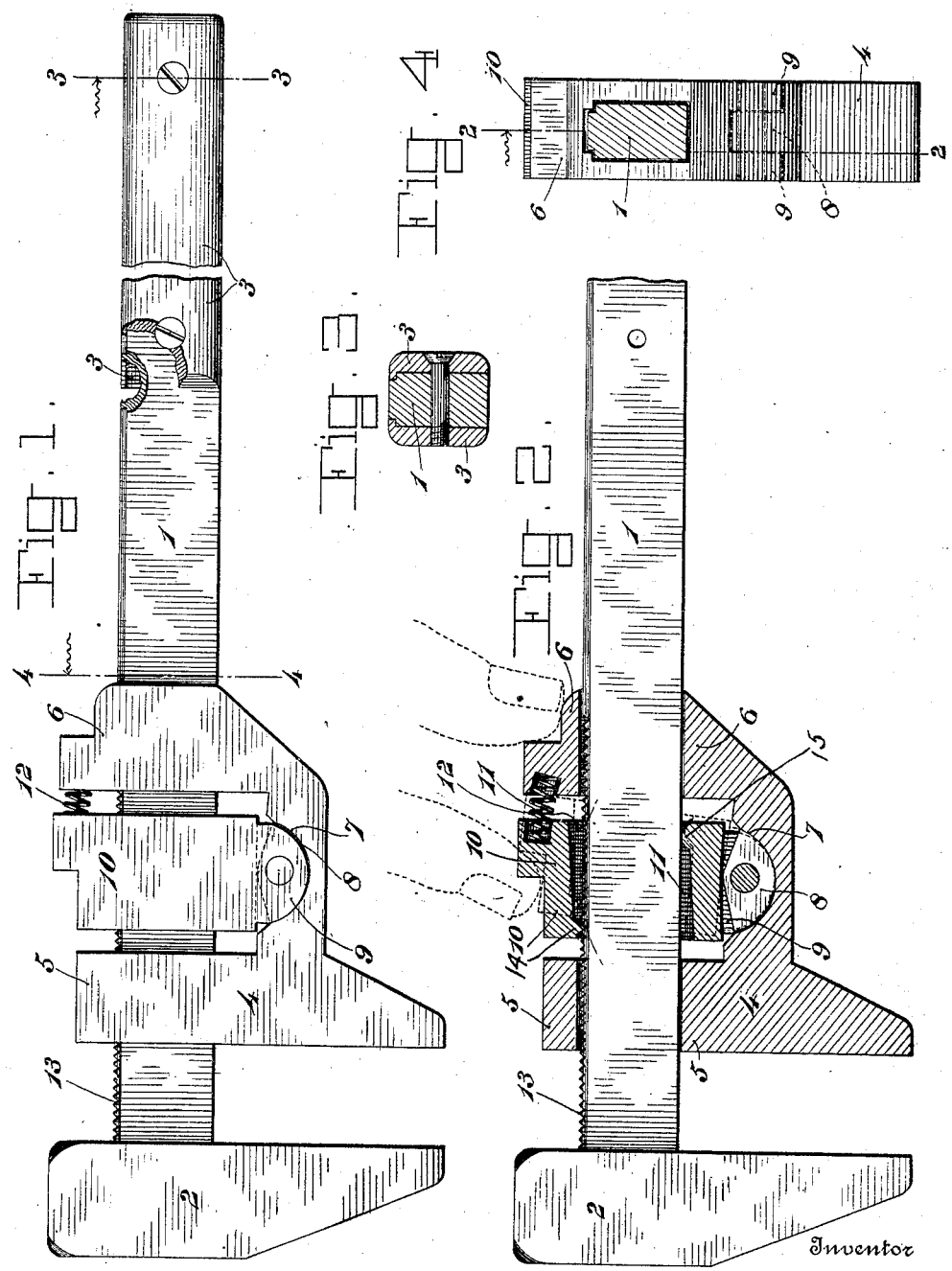

ADOLF FAGER, OF MADERA, PENNSYLVANIA.

WRENCH.

990,718.

Specification of Letters Patent. Patented Apr. 25, 1911.

Application filed January 7, 1911. Serial No. 601,303.

*To all whom it may concern:*

Be it known that I, ADOLF FAGER, a citizen of the United States, residing at Madera, in the county of Clearfield and State of Pennsylvania, have invented new and useful Improvements in Wrenches, of which the following is a specification.

This invention relates to wrenches and more particularly to the type which is known in the art as monkey wrenches.

The object of the invention is the provision of a device of this character employing a sliding jaw which may be readily moved upon the shank into adjusted engagement with the nut to be operated upon and automatically locked in such position, the locking mechanism acting in such a manner that as the pressure exerted to turn the nut increases the gripping force of the locking mechanism is also increased.

Further objects of the invention will appear as the following specific description is read in connection with the accompanying drawings which form a part of this application and in which:—

Figure 1 is a side elevation. Fig. 2 is a longitudinal section therethrough. Fig. 3 is a section taken on the line 3—3 of Fig. 1. Fig. 4 is a section taken on the line 4—4 of Fig. 1.

Referring more particularly to the drawing 1 represents the shank of the device upon which is formed the stationary jaw 2. The opposite end of the shank 1 has secured thereto the handle members 3 in such a manner that they may be readily removed so as to disconnect the sliding jaw 4 from the shank when it is necessary to make repairs. The sliding jaw 4 comprises a yoke-shaped casting which has the separate legs 5 and 6 thereof transversely apertured to receive the shank 1. The yoke portion between the separate legs is provided with recesses 7 and intermediate the recesses is a pivoting web 8 which is straddled by the pivoting ears 9 of the locking dog 10. This locking dog is provided with a transverse aperture 11 which receives the shank 1 and which is of such dimensions as to permit the dog to tilt upon its pivoting ear against the tension of a spiral spring 12, arranged between the under side of the dog and the upper side of the leg 6 and being held by inherent resiliency in the sockets formed in the dog and leg.

The rear edge of the shank 1 is provided throughout a portion of its length with a raised rack or ratchet surface 13 which is engaged by a tooth 14 formed on the rear wall of the aperture 11. When the sliding jaw is moved toward the stationary jaw 2 it will be noticed that the dog 10 will rise idly over the rack surface 13, the spring 12 giving to permit such movement. The opposite movement of the jaw 4, however, without manipulation of the dog 10 will result in the positive engagement of the tooth 14 with the rack surface 13, the opposite wall of the aperture therethrough having a projecting lug or rib 15 which engages the opposite side of the shank diagonally across the shank from the tooth 14 so as to cause a binding action. Depressing the dog against the tension of the spring 12 will cause the disengagement of the tooth 14 from the rack surface 13 so that the jaw 4 may be readily moved away from the jaw 2.

This device is designed particularly to provide a quick-acting wrench which may be conveniently adjusted to the size of the nut to be operated upon and which will automatically lock the sliding jaw in adjusted position, and is further designed to obviate the difficulties encountered in providing a loose locking pawl which is held in position by a pivoted yoke, for in these devices it is necessary to move the yoke by hand when it is desired to lock the pawl and to also move the same by hand when it is desired to release the pawl so that the jaw can be moved. It will be noticed that as pressure is exerted to tighten the nut or to loosen the same, and the jaw 4 consequently forced away from the jaw 2 that the locking dog 10 with its positive engagement with the rack surface 13 will be drawn toward the leg 5 of the sliding jaw on account of its pivotal connection with said jaw and thereby increase its holding capacity in proportion to the strain exerted upon the jaw.

I claim:—

In combination, a shank having a ratchet surface and a stationary jaw thereon, of a yoke-shaped sliding jaw freely mounted to slide upon the shank, a locking dog surrounding the shank and pivotally mounted between the legs of the yoke-shaped sliding jaw, a ratchet tooth upon said locking dog adapted to ride idly over the rack surface of the shank in one direction of movement, a lug carried by the dog and adapted to engage the shank to cause a bumping action in the opposite direction of movement, and means arranged between the locking dog and one of the legs of the sliding jaw for normally holding the rack surface on said jaw in engagement with the rack surface on the shank.

In testimony whereof I affix my signature in presence of two witnesses.

ADOLF FAGER.

Witnesses:
E. G. MILES,
JAMES SHARP.

Copies of this patent may be obtained for five cents each, by addressing the "Commissioner of Patents, Washington, D. C."